(No Model.)
C. W. WARNER.
PLANTER.
No. 581,381. Patented Apr. 27, 1897.
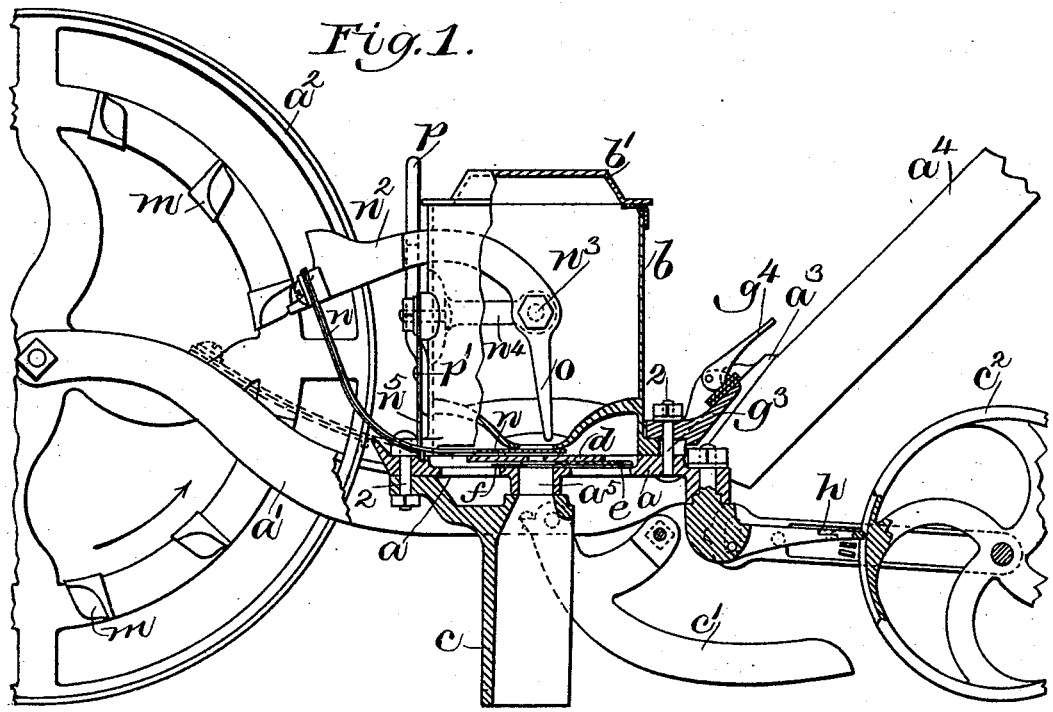
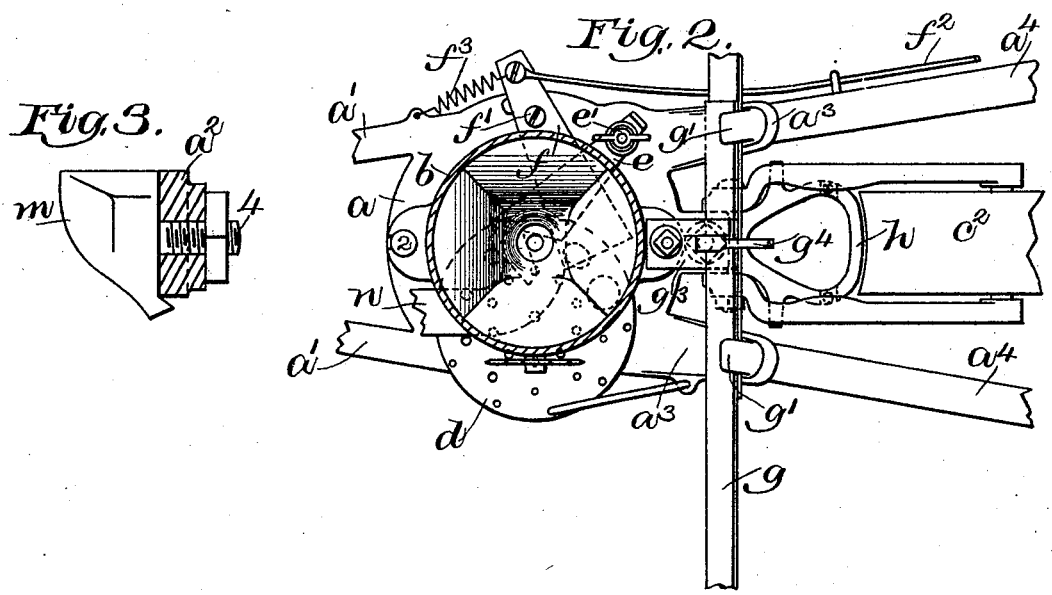
Witnesses
F. H. Davis
A. O. Orr
Inventor
Charles W. Warner
by B. J. Hayes, atty.

UNITED STATES PATENT OFFICE.

CHARLES W. WARNER, OF MELROSE, MASSACHUSETTS.

PLANTER.

SPECIFICATION forming part of Letters Patent No. 581,381, dated April 27, 1897.

Application filed February 10, 1896. Serial No. 578,678. (No model.)

*To all whom it may concern:*

Be it known that I, CHARLES W. WARNER, of Melrose, county of Middlesex, State of Massachusetts, have invented an Improvement in Planters, of which the following description, in connection with the accompanying drawings, is a specification, like letters and figures on the drawings representing like parts.

This invention relates to seed-planters, and has for its object to improve and simplify the construction of the same in many particulars, especially adapting it for use as an automatic hill-planter yet it is easily convertible into a drill-planter; and the invention consists in many details of construction to be hereinafter pointed out.

Figure 1 shows a vertical section and partial elevation of a seed-planter embodying this invention; Fig. 2, a plan view of the planter shown in Fig. 1; Fig. 3, a detail of one of the lugs on the ground-wheel.

The base-plate $a$ has two forwardly-extended arms $a'$, between which the ground-wheel $a^2$ is journaled, and has two rearwardly-extending projections $a^3$, to which the handle-bars $a^4$ are secured, and said base is formed to receive upon it a seed-hopper $b$ and is provided with a central hole $a^5$ in line with the exit at the bottom of said seed-hopper.

The drill-former $c$, covering-plates $c'$, and covering-wheel $c^2$, all of which are old, are attached to or suitably supported by the base.

The seed-hopper $b$ is made as a hollow cylinder, provided at the top with a suitable cover $b'$, and provided near its lower end with a funnel-formed bottom having a central exit.

The lower end of the funnel-formed bottom terminates slightly above the lower end of the cylinder, so that said cylinder may rest upon or be secured to the base $a$ by bolts 2 or otherwise, and a narrow space is presented between the top of the base $a$ and the lower end of the funnel-formed bottom. I preferably slightly increase this space by forming a more or less circular recess in the top of the base $a$. Contained in this narrow space between the base $a$ and the lower end of the funnel-formed bottom is the usual perforated disk $d$, adapted to be turned to present holes of different sizes in line with the exits. Also in said space a plate $e$ is placed, which is adjustably attached to the base $a$ by a thumb-screw $e'$, and by moving said plate so as to cover more or less of any of the holes in the disk $d$, which may be presented in line with the exit, said exit will be very finely adjusted. Also in said space is a manual shut-off, which is made as a plate $f$, pivoted at $f'$ to the base $a$, and provided with a hand-operated rod $f^2$ and with an actuating-spring $f^3$. Above the disk $d$ and working in said narrow space is the automatic valve, which is made as a flexible plate $n$, of brass or equivalent material, which is passed through a slot formed at the lower end of the cylinder $b$ beneath the funnel-formed bottom thereof, and extends along beneath said bottom, so as to cover the exit. This slot in the cylinder and the narrow space beneath the funnel-formed bottom form a guide-passage for the flexible plate $n$.

The flexible plate $n$ is extended forward and upward, and its upper end is attached to an arm $n^2$, pivoted at $n^3$ to a lug or projection $n^4$, contained within the seed-hopper, said arm working up and down in a slot formed in the seed-hopper as it is turned on its pivot. A flat spring $n^5$ is attached to the seed-hopper and extends down and is connected with the flexible plate $n$, said spring tending to hold said plate in a predetermined position— as, for instance, in a position to normally close the exit of the funnel-formed bottom; but it is obvious that this same result could be accomplished under certain conditions by a weight or by weighting the arm, which of course would be the obvious equivalent of said spring. As a means of operating said pivoted arm $n^2$ to thereby automatically operate the valve-plate $n$ I have provided lugs $m$ on the ground-wheel $a^2$, and the arm $n^2$ is made of sufficient length to enter the path of movement of said lugs as the ground-wheel revolves. Each time one of the lugs engages the pivoted arm $n^2$ it raises said arm and draws the flexible plate $n$ from its guide-passage a suitable distance to uncover the exit of the seed-hopper, after which the spring $n^5$ restores said plate to its normal position.

The lugs $m$ are made detachable—as, for instance, they may be connected by bolts 4—and consequently as many may be employed as desired, which may be located at any distance apart desired to operate the arm and thereby vary the distance between the hills.

For convenience and simplicity I have formed the agitating-arm $o$ integral with the arm $n^2$, or it may be attached thereto in any desirable way, so as to be operated by said arm $n^2$, thereby obviating the necessity of providing additional operating devices for the agitator. This agitating-arm $o$ extends down toward the lower end of the funnel-formed bottom of the seed-hopper and works back and forth over the exit.

Whenever it is desirable, the arm $n^2$ may be raised out of the path of movement of the lugs on the ground-wheel and held in such position by means of a shouldered arm $p$, pivoted at $p'$ to the seed-hopper, the arm $n^2$ resting upon the shoulder thereof.

If it should be desired to so arrange the parts as to sow in drills, the upper end of the flexible plate $n$ may be disconnected from the arm $n^2$ and attached to a fixed point on the frame, as shown by dotted lines, Fig. 1, and in such case the agitator will be operated by the ground-wheel.

The funnel-formed bottom of the seed-hopper forms an important feature of this invention, as it is so constructed and arranged as to more easily and also more surely deliver the seed, and operates effectively with both large and small quantities of seed—as, for instance, the hopper may be more or less filled, or it may contain a single paper or package of seed. In carrying out this part of my invention I have provided the funnel-formed bottom with an abruptly-declining portion for a short distance about midway between the upper and lower ends, and the seed is thus given an opportunity of falling more quickly at such point, and such abrupt portion divides the funnel-formed bottom into two compartments, the lower one of which is quite small, and when but a little seed is contained in the hopper such a compartment concentrates it and permits it to be more readily delivered. Such an abrupt declining portion may be made by forming the funnel with ogee sides or faces. I have also made the funnel-formed bottom polygonal—that is to say, it is composed of several conjoining sides or faces—and by such construction shallow grooves or channels are formed at the junction of said sides or faces, which receive the seed and direct it along its course.

The marker-bars $g$ rest in or beneath suitable supports $g'$ on the handle-bars, and between said handle-bars a projection $g^3$ is formed on the base of the machine, which has a slot adapted to receive said marker-bars, they lying one upon or against the other, and a cam-lever $g^4$ is pivoted to said projection $g^3$, adapted to impinge upon the uppermost bar, as it is turned in one direction, to press said bar down hard upon the lowermost bar, and thereby hold the two bars in place, said cam-lever $g^4$ being operated by hand. Such a device for holding the marker-bars permits them to be easily and quickly adjusted.

The scraper for the covering-wheel $c^2$ is formed as a yoke with a cross-bar $h$ at the end joining the extremities of the arms of said yoke, said cross-bar being made of steel, if desired, and such construction of scraper presents an opening through it, which enables the operator to watch the dropping of the seed in the hills or drills.

It is obvious that the cross-bar $h$ could be formed integral with the yoke, if desired.

Herein it will be seen that the automatic shut-off $n$ and manual shut-off $f$ work one upon the other and directly beneath the exit, and such feature is important, as it enables the exit to be closed by the shut-off $f$, while at the same time the shut-off $n$ may be operating.

In planting when the operator arrives at the end of the rows he can thus close the exit and wheel the machine along, the automatic shut-off continuing to operate, and owing to the proximity of the shut-off plates to each other no seed escapes.

I claim—

1. In a planter, the flexible delivery-plate $n$ which moves in a guide-passage beneath the seed-hopper and controls the delivery of seed therefrom, and the pivoted arm $n^2$ to which it is attached which projects into the path of movement of lugs on the ground-wheel, substantially as described.

2. In a planter, the flexible delivery-plate $n$ which moves in a guide-passage beneath the seed-hopper and controls the delivery of seed therefrom, and pivoted arm $n^2$ to which it is attached which projects into the path of movement of lugs on the ground-wheel, and the restoring-spring $n^5$, substantially as described.

3. In a planter, the seed-hopper having a horizontal guide-passage beneath it, the flexible plate $n$ working in said passage having an upwardly-projecting end, the pivoted arm $n^2$ to which the outer end of said flexible plate $n$ is attached which projects into the path of movement of lugs on the ground-wheel, and the plate $n^5$ attached at one end to a support and at the other end to said flexible plate $n$, and serves as a movable support or prop for said plate $n$, substantially as described.

4. In a planter, a seed-hopper having a horizontal guide-passage beneath it, the flexible plate $n$ working in said passage having an upwardly-projecting end, the pivoted arm $n^2$ to which the outer end of said flexible plate is attached which projects into the path of movement of lugs on the ground-wheel, and the spring-plate $n^5$ attached at one end to a support and at the other end to said flexible plate $n$ and serves as a movable support or prop for said plate $n$, and also as the restoring-spring therefor, substantially as described.

5. In a planter, the flexible plate $n$ which moves in a guide-passage beneath the seed-hopper, and controls the delivery of seed therefrom, the arm $n^2$ pivoted to a support within said seed-hopper which projects forwardly through a slot in the side wall of said hopper into the path of movement of lugs on the ground-wheel, and means for attaching said plate $n$ to said pivoted arm, and the agitator $o$ borne by said arm $n^2$, substantially as described.

6. In a planter, the flexible plate $n$ which moves in a guide-passage beneath the seed-hopper and controls the delivery of seed therefrom, the arm $n^2$ pivoted to a support within said seed-hopper which projects forwardly through a slot in the side wall of said hopper into the path of movement of lugs on the ground-wheel and means for attaching said plate $n$ to said pivoted arm, the agitator $o$ borne by said arm $n^2$, and the restoring-spring $n^5$ for restoring both the plate $n$ and agitator $o$, substantially as described.

7. In a planter, a seed-hopper having an exit, a perforated disk adjustably secured in position beneath it and the plate $e$ located beneath said disk and adjustably connected to the frame, adapted to cover more or less of any one of the holes in said disk to thereby vary its size, the cut-off plate $f$ and manual-operating device therefor substantially as described.

8. In a planter, the marker-bars, side supports and a central support therefor, and the pivoted cam-lever $g^4$ which acts upon said bars to hold them in adjusted position, substantially as described.

9. In a planter, the seed-hopper having a funnel-formed bottom provided with a short abruptly-declining portion between the upper and lower ends thereof, substantially as described.

10. In a planter, a seed-hopper having an ogee funnel-formed bottom, substantially as described.

11. In a planter, a seed-hopper having a polygonal ogee funnel-formed bottom, substantially as described.

In testimony whereof I have signed my name to this specification in the presence of two subscribing witnesses.

CHARLES W. WARNER.

Witnesses:
B. J. NOYES,
F. H. DAVIS.